United States Patent
Aikawa et al.

(10) Patent No.: US 7,990,004 B2
(45) Date of Patent: Aug. 2, 2011

(54) REDUCTION DRIVE DEVICE

(75) Inventors: Masashi Aikawa, Tochigi (JP);
Masayuki Sayama, Tochigi (JP);
Yoshiyuki Nakabayashi, Tochigi (JP)

(73) Assignee: GKN Driveline Torque Technology KK, Tochigi-Ken (JP)

( * ) Notice: Subject to any disclaimer, the term of this patent is extended or adjusted under 35 U.S.C. 154(b) by 64 days.

(21) Appl. No.: 11/992,256

(22) PCT Filed: Sep. 16, 2006

(86) PCT No.: PCT/JP2006/318537
§ 371 (c)(1),
(2), (4) Date: Mar. 19, 2008

(87) PCT Pub. No.: WO2007/034794
PCT Pub. Date: Mar. 29, 2007

(65) Prior Publication Data
US 2009/0160274 A1      Jun. 25, 2009

(30) Foreign Application Priority Data

Sep. 20, 2005   (JP) ................................. 2005-271991

(51) Int. Cl.
*H02K 5/12*      (2006.01)
*H02K 5/00*      (2006.01)
*H02K 7/10*      (2006.01)
*H02K 49/00*    (2006.01)
*H02K 15/00*    (2006.01)

(52) U.S. Cl. ................ 310/89; 310/88; 310/58; 310/91; 310/99

(58) Field of Classification Search .................... 310/83, 310/89, 58, 91, 99; *H02K 5/12, 5/00, 7/10, H02K 49/00, 15/00*
See application file for complete search history.

(56) References Cited

U.S. PATENT DOCUMENTS

| 5,821,653 | A  | * | 10/1998 | Kinto et al. ...................... 310/89 |
| 6,413,183 | B1 | * | 7/2002  | Ishikawa et al. ............... 475/160 |
| 6,770,005 | B2 | * | 8/2004  | Aikawa et al. ..................... 475/5 |
| 6,827,661 | B2 | * | 12/2004 | Fusegi et al. .................... 475/150 |
| 6,860,464 | B1 | * | 3/2005  | Quitmeyer et al. ............. 251/14 |
| 6,969,333 | B2 | * | 11/2005 | Sayama ............................. 475/5 |
| 2003/0054913 | A1 | * | 3/2003 | Sayama ........................ 475/203 |
| 2004/0154853 | A1 | * | 8/2004 | Aikawa et al. ................ 180/242 |
| 2006/0014602 | A1 | * | 1/2006 | Sayama ........................ 475/231 |

FOREIGN PATENT DOCUMENTS

| JP | 9-226394 | 9/1997 |
| JP | 2000-203295 | 7/2000 |
| JP | 2003-063265 | 3/2003 |
| JP | 2003-231419 | 8/2003 |
| JP | 2004-293584 | 10/2004 |
| JP | 2005-067559 | 3/2005 |
| JP | 2005-098477 | 4/2005 |

* cited by examiner

*Primary Examiner* — Quyen Leung
*Assistant Examiner* — Terrance Kenerly
(74) *Attorney, Agent, or Firm* — Jordan and Hamburg LLP

(57) ABSTRACT

A reduction drive device is compact, hardly causes an electric motor thereof to vibrate, and has improved noise/vibration controllability. The reduction drive device includes the electric motor attached to a casing and capable of outputting torque, first and second reduction mechanisms supported by the casing, to reduce and transmit the rotational output of the electric motor, and a rear differential supported by the casing, to distribute the rotational output reduced by the first and second reduction mechanisms to a pair of axle shafts. Rotor, stator, and brush of the electric motor partly overlap the rear differential when seen in a rotation radius direction.

14 Claims, 6 Drawing Sheets

REDUCTION DRIVE DEVICE

BACKGROUND OF THE INVENTION

This invention relates to a reduction drive device for a power transmission system installed on an electric motor side of an electric vehicle employing an electric motor as a drive source or a four-wheel-drive hybrid electric vehicle employing an engine (internal combustion engine) and an electric motor as drive sources.

A conventional reduction drive device is, for example, the one shown in FIG. 6. In FIG. 6, the reduction drive device 201 reduces output of an electric motor 203 and transmits the same to left and right axle shafts to drive, for example, left and right rear wheels. The electric motor 203 is used as a supplementary drive source. A front-wheel side employs an engine such as an internal combustion engine as a main drive source to drive left and right front wheels.

The reduction drive device 201 has a casing 205 that supports a reduction mechanism 206 and a differential gear 207. The differential gear 207 is coupled with the axle shafts interlinked with, for example, the left and right rear wheels. The electric motor 203 is fastened and fixed to a motor joint 209 of the casing 205 with bolts 211.

The reduction mechanism 206 reduces rotational output of the electric motor 203 and the reduced rotational output is distributed through the differential gear 207 to the left and right axle shafts.

According to such a reduction drive device 201, the electric motor 203 extremely protrudes from the motor joint 209 of the casing 205 in an axial direction (rightward in FIG. 6), thereby enlarging the total size of the device, easily causing the electric motor 203 to vibrate, and limiting noise/vibration controllability.

Patent literature 1: Japanese Unexamined Patent Application Publication No. 2004-293584

SUMMARY OF THE INVENTION

Problems to be solved by the invention are that the device as a whole is bulky, the electric motor is prone to vibrate, and there is a limit in noise/vibration controllability.

The most important characteristic of the present invention is that internal functional parts of an electric motor partly overlap with a distribution mechanism when viewed in a rotation radius direction so as to reduce the size of a device as a whole, prevent the electric motor from vibrating, and improve noise/vibration controllability.

In a reduction drive device according to the present invention, internal functional parts of an electric motor partly overlap with a distribution mechanism when seen in a rotation radius direction, so that the electric motor may not protrude in a rotation axis direction from a casing and the total size of the device may be reduced. Suppressing the protrusion of the electric motor results in preventing the electric motor from vibrating and improving noise/vibration controllability.

The objects of reducing the total size of the device, preventing the electric motor from vibrating, and improving noise/vibration controllability are realized by partly overlapping components each other when seen in a rotation radius direction.

DETAILED DESCRIPTION OF THE INVENTION

Embodiment 1

Figure 1:
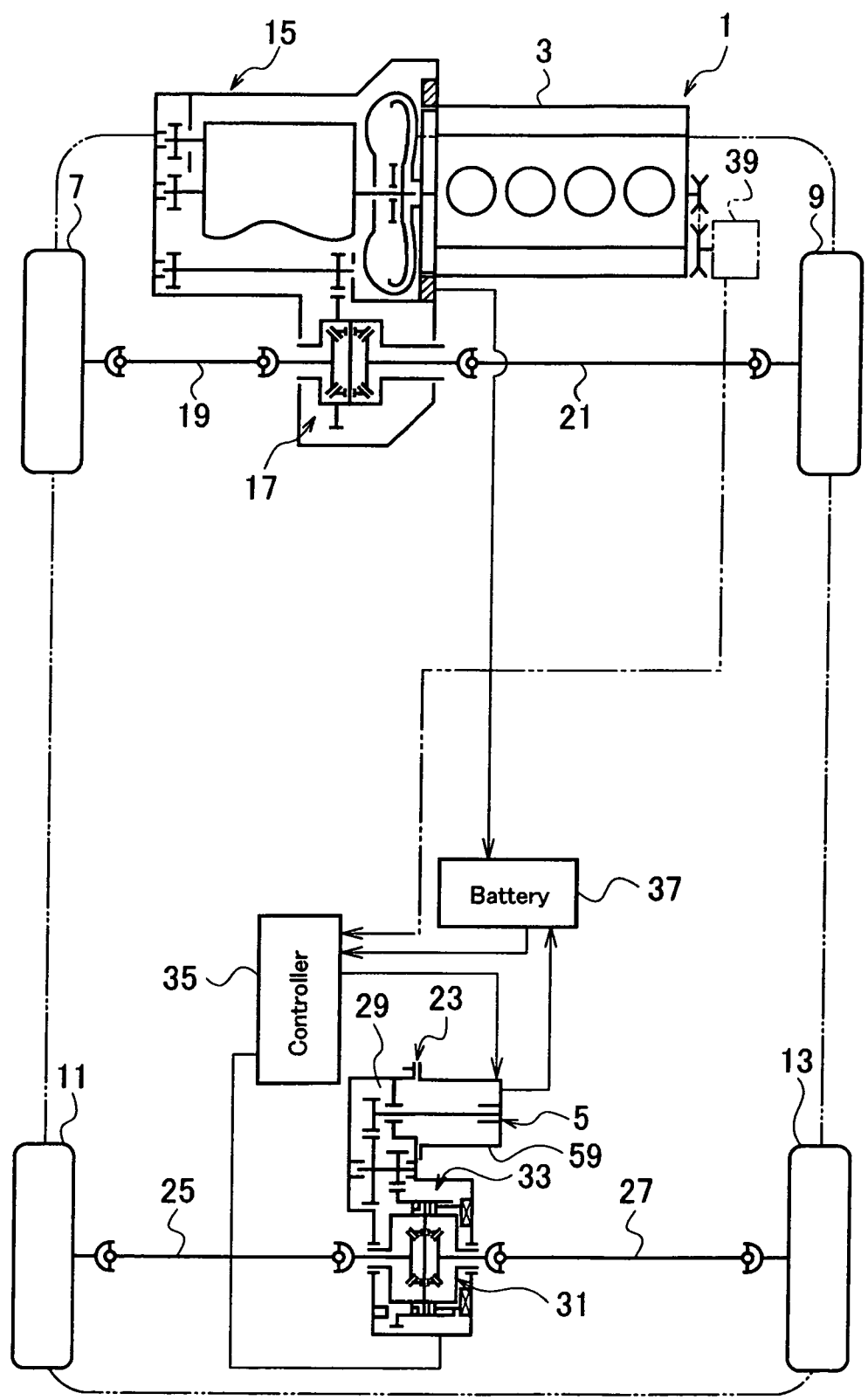
FIG. 1 is a skeleton plan view showing a four-wheel-drive vehicle (Embodiment 1)

FIG. 1 is a skeleton plan view showing a four-wheel-drive vehicle employing a reduction drive device according to an embodiment of the present invention. As shown in FIG. 1, the four-wheel-drive vehicle 1 has an engine 3 that is an internal combustion engine serving as a main drive source and an electric motor 5 serving as a supplementary drive source.

The engine 3 is a main drive source for driving left and right front wheels 7 and 9 and the electric motor 5 is a supplementary drive source for driving left and right rear wheels 11 and 13. It is possible to configure so that the front wheels are driven by the supplementary drive source, i.e., the electric motor 5 and the rear wheels 11 and 13 by the main drive source, i.e., the engine 3.

Output of the engine 3 is supplied through a transmission 15 to a front differential 17. The front differential 17 is interlinked through left and right axle shafts 19 and 21 with the front wheels 7 and 9.

The electric motor 5 is configured as a drive source of the reduction drive device 23. An output side of the reduction drive device 23 is interlinked through a pair of output shafts, i.e., left and right axle shafts 25 and 27 with the left and right rear wheels 11 and 13.

Rotational output of the electric motor 5 is input to a reduction mechanism 29 of the reduction drive device 23. The reduction drive device 23 has a rear differential 31. The rear differential 31 is interlinked with the left and right axle shafts 25 and 27. The reduction drive device 23 has a clutch 33. The clutch 33 connects and disconnects torque transmission between the reduction mechanism 29 and the rear differential 31.

The electric motor 5 is controlled by a controller 35 serving as control means. The controller 35 receives detected values from wheel speed sensors of the front and rear wheels 7, 9, 11, and 13, detected signals from various sensors, and the like.

The electric motor 5 receives power from a battery 37. The battery 37 is connected to a generator 39 for charging power. The battery 37 is also charged by the motor 5 when the vehicle decelerates, for example. This, however, takes place only when the clutch 33 is connected as will be explained later.

During normal running, the controller 35 stops the electric motor 5 and disconnects the clutch 33, thereby stopping torque transmission to the rear wheels 11 and 13 side. The engine 3 is driven to transmit torque through the transmission 15 to the front differential 17. From the front differential 17, the torque is transmitted through the left and right axle shafts 19 and 21 to the left and right front wheels 7 and 9, thereby two-wheel-driving the vehicle.

Starting or accelerating the vehicle needs large driving force, and therefore, the controller 35 drives the electric motor 5 and connects the clutch 33. As a result, output torque of the electric motor 5 is transmitted to the reduction mechanism 29, clutch 33, and rear differential 31 of the reduction drive device 23. From the rear differential 31, the torque is transmitted through the left and right axle shafts 25 and 27 to the left and right rear wheels 11 and 13.

As a result, with the engine 3 driving the front wheels 7 and 9 and the electric motor 5 driving the rear wheels 11 and 13, the four-wheel-drive vehicle 1 can start or accelerate with large driving force in the four-wheel-driving state.

Figure 2:
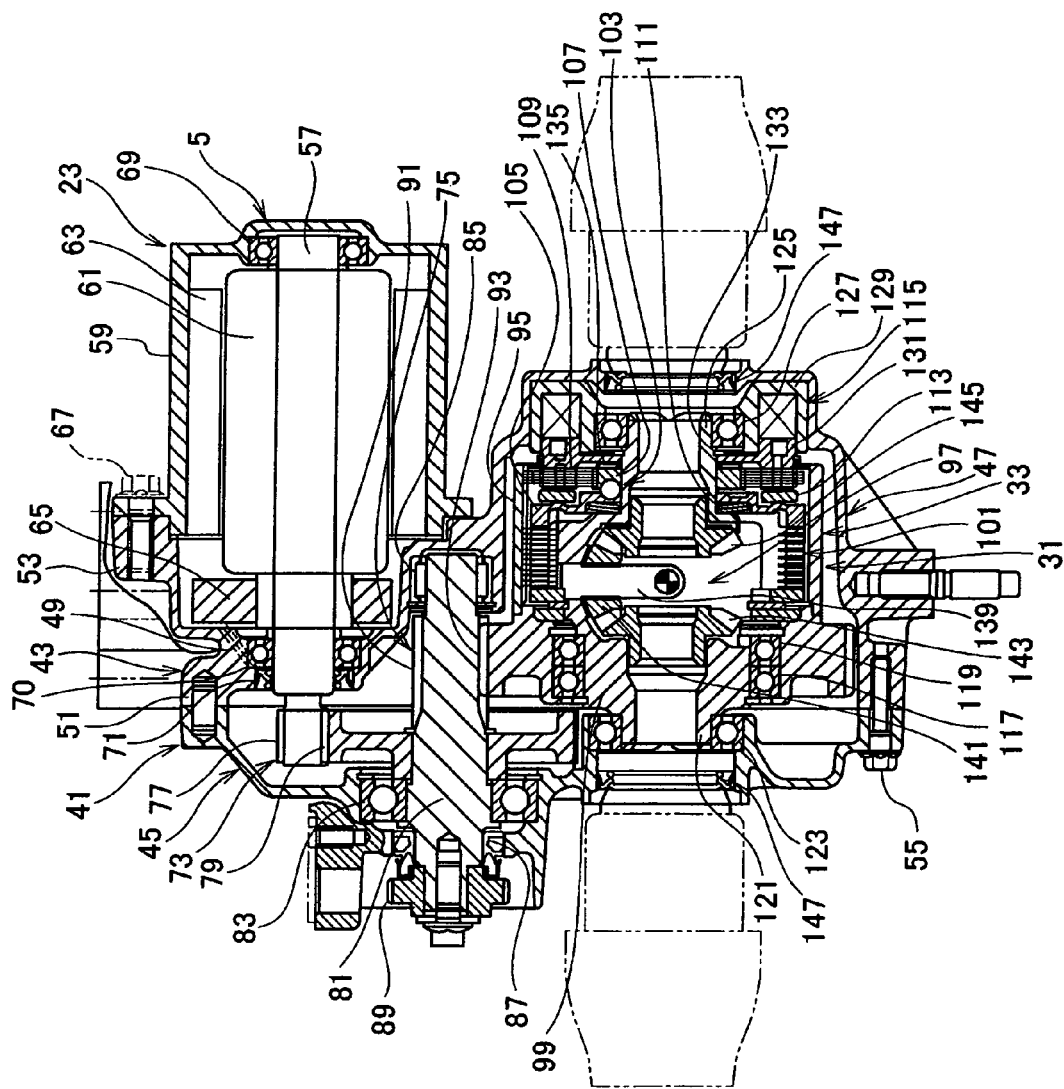
FIG. 2 is a sectional view showing a reduction drive device (Embodiment 1)

The reduction drive device 23 is configured, for example, as shown in FIG. 2. FIG. 2 is a sectional view showing the reduction drive device 23.

As shown in FIG. 2, the reduction drive device 23 is contained in a casing 41. The casing 41 includes a casing body 43 and a cover 45.

The casing body 43 is provided with a rear differential container 47 and a motor shaft support 49. On one side of the rear differential container 47 and motor shaft support 49, there is a cover joint 51. On the other side of the motor shaft support 49, there is a motor joint 53. The motor shaft support 49 is adjacent to the cover joint 51 and the motor joint 53 is generally shifted toward the cover joint 51 relative to the rear differential container 47.

The cover 45 is fixed to the cover joint 51 of the casing body 43 with bolts 55.

The electric motor 5 has an output shaft 57. Within a motor cover 59, there are internal functional parts of the electric motor 5 such as a rotor 61, a stator 63, a brush 65, and the like. The motor cover 59 is fastened to the motor joint 53 of the casing body 49 with bolts 67. In this state, the output shaft 57 is rotatably supported by ball bearings 69 and 70 with respect to the motor cover 59 and motor shaft support 49. The brush 65 and part of the rotor 61 are located in the motor joint 53. Namely, the motor joint 53 also provides a motor cover function. The motor joint 53 serving as a fitting part of the casing 41 where the electric motor 5 is fitted also serves as a divided part of the motor cover that is an outer shell of the electric motor 5. Between the motor shaft support 49 and the output shaft 57, there is interposed an oil seal 71.

The reduction mechanism 29 is to reduce rotational output of the electric motor 5 and provide the clutch 33 with the reduced rotational output and has a two-stage configuration including first and second reduction mechanisms 73 and 75.

The first reduction mechanism 73 includes reduction gears, i.e., a small gear 77 and a large gear 79 that mesh with each other. The small gear 77 is integrally formed at an end of the output shaft 57 of the electric motor 5 and the large gear 79 is pressurized into and supported by a second shaft 81. A first end of the second shaft 81 is supported by a ball bearing 83 with respect to the cover 45 and a second end thereof is supported by a needle bearing 85 with respect to the casing body 43. Between the first end of the second shaft 81 and the cover 45, there is an oil seal 87 to prevent oil from leaking outside. The end of the second shaft 81 protrudes outside from the cover 45 and is provided with a rotation detecting gear 89.

The second reduction mechanism 75 includes a small gear 91 and a large gear 93 that mesh with each other. The small gear 91 is formed integrally with the second shaft 81 and the large gear 93 is welded to an end of an outer differential case 95 of the rear differential 31.

Output torque of the electric motor 5 is reduced by the first and second reduction mechanisms 73 and 75 to a running rotation range of the rear wheels 11 and 13. Namely, the torque is amplified to turn the outer differential case 95 of the rear differential 31.

The rear differential 31 includes the clutch 33, a bevel gear differential mechanism 97, and the like.

The clutch 33 consists of the outer differential case 95, an inner differential case 99, a multiplate main clutch 101, a ball cam 103, a pressure plate 105, a cam ring 107, a multiplate pilot clutch 109, a return spring 111, an armature 113, and an electromagnet 115.

The large gear 93 of the outer differential case 95 is supported by ball bearings 117 and 119 with respect to the inner differential case 99. The outer differential case 95 only transfers torque from the large gear 93 and employs a floating configuration that is free from a member supporting function.

The inner differential case 99 has, at a first end, a boss 121 supported by a ball bearing 123 with respect to the cover 45, and at a second end, a boss 125 supported by a ball bearing 127 with respect to a core 129 of the electromagnet 115 and the casing body 43. The core 129 is fixed to an end of the rear differential container 47 of the casing body 43.

Around the boss 125, there is a rotor 131 that is made of a magnetic material and is axially positioned with a snap ring 133.

The main clutch 101 is arranged between the outer differential case 95 and the inner differential case 99. Outer plates of the main clutch 101 are spline-engaged with an inner circumference of the outer differential case 95 and inner plates thereof are spline-engaged with an outer circumference of the inner differential case 99.

The pilot clutch 109 is arranged between the outer differential case 95 and the cam ring 107. Outer plates of the pilot clutch 109 are spline-engaged with the inner circumference of the outer differential case 95 and inner plates thereof are spline-engaged with an outer circumference of the cam ring 107.

The ball cam 103 is formed between the pressure plate 105 and the cam ring 107. The pressure plate 105 is spline-engaged with the outer circumference of the inner differential case 99 and is axially movable so that it may push the main clutch 101 with the help of cam thrust force of the ball cam 103.

Between the cam ring 107 and the rotor 131, there is a thrust bearing 135. The thrust bearing 135 receives cam reaction force of the ball cam 103 and absorbs relative rotation between the cam ring 107 and the rotor 131.

Between the pressure plate 105 and the inner differential case 99, there is the return spring 111. The pressure plate 105 is pushed by the return spring 111 toward a direction of releasing engagement of the main clutch 101.

The armature 113 is formed in a ring shape and is arranged to be axially movable between the pressure plate 105 and the pilot clutch 109.

A lead wire of the electromagnet 115 is guided through a grommet to the outside of the casing body 43 and is connected through a connector to the battery 37.

Between the core 129 and rotor 131 of the electromagnet 115, a proper air gap is formed. The air gap, rotor 131, pilot clutch 109, and armature 113 form a magnetic path of the electromagnet 115. When the electromagnet 115 is energized, a magnetic flux loop is formed on the magnetic path.

The differential mechanism 97 has a pinion shaft 139, pinion gears 141, and output side gears 143 and 145.

The side gears 143 and 145 are spline-engaged with the left and right axle shafts 25 and 27, respectively. The axle shafts 25 and 27 pass through the bosses 121 and 125 of the inner differential case 99, the cover 45, and the casing body 43 and engage with the left and right rear wheels 11 and 13, respectively.

Between the axle shafts 25 and 27 and the cover 45 and rear differential container 47, there are oil seals 147 to prevent oil from leaking outside.

According to this embodiment, a distribution mechanism is supported by the casing 41, to distribute the rotational output reduced by the reduction mechanism 29 to a pair of the axle shafts 25 and 27. The distribution mechanism consists of the inner differential case 99 that is a differential case and the differential mechanism 97 that is supported by the inner differential case 99 and is coupled with a pair of the axle shafts 25 and 27. With respect to the distribution mechanism, part of the rotor 61, part of the stator 63 and the brush 65 that are the internal functional parts of the electric motor 5 overlap when seen in a rotation radius direction (vertical direction in FIG. 2).

This therefore prevents an end face of the electric motor 5 from protruding in a rotary axis direction (rightward direction of FIG. 2) from an end face of the rear differential container 47 of the casing 41, thereby reducing a total size. Preventing the protrusion of the electric motor 5 results in shortening a cantilever span of the electric motor 5, so that the electric motor 5 may hardly vibrate due to the rotation thereof or input vibration, to thereby improve noise/vibration controllability.

In particular, this embodiment overlaps part of the rotor 61 and the brush 65 of the electric motor 5 with the second shaft 81 in the rotation radius direction. This further prevents the end face of the electric motor 5 from protruding from the end face of the rear differential container 47 of the casing 41 in the rotation axis direction (rightward direction of FIG. 2), to further reduce the size of the device and improve the noise/vibration controllability.

Output of the electric motor 5 is transmitted from the output shaft 57 to the outer differential case 95 through the first and second reduction mechanisms 73 and 75. From the outer differential case 95, the output is transmitted through the clutch 33 to the inner differential case 99.

The rotation of the inner differential case 99 is distributed from the pinion shaft 139 to the side gears 143 and 145 through the pinion gears 141, and from the axle shafts 25 and 27 to the left and right rear wheels 11 and 13.

If a driving resistance difference occurs between the rear wheels 11 and 13 on, for example, a rough road, driving force of the electric motor 5 is differentially distributed to the left and right rear wheels 11 and 13 due to the rotation of the pinion gears 141.

Engaging control of the clutch 33 is carried out by, for example, controlling the energization of the electromagnet 115 as explained below.

The controller 35 controls the energization of the electromagnet 115 according to a road surface condition and running and steering conditions such as the starting, accelerating, and turning of the vehicle detected by various sensors.

The energization control of the electromagnet 115 is carried out in combination with the operation control of the electric motor 5. Deactivating the electromagnet 115 is carried out when stopping the electric motor 5.

When the electromagnet 115 is excited, the magnetic flux loop mentioned above attracts the armature 113 to engage the pilot clutch 109 between the armature 113 and the rotor 131, thereby generating pilot torque. Due to the generation of the pilot torque, the pilot clutch 109 makes torque transmitted from the electric motor 5 act on the ball cam 103 through the cam ring 107 coupled with the outer differential case 95 and the pressure plate 105 on the inner differential case 99 side. The ball cam 103 amplifies the transmitted torque and converts the same into cam thrust force to move the pressure plate 105 and engage the main clutch 101.

When the clutch 33 is engaged in this way, the torque of the electric motor 5 transmitted to the large gear 93 is transmitted from the outer differential case 95 to the inner differential case 99 whose rotation is distributed to the left and right rear wheels 11 and 13 through the differential mechanism 97, to put the vehicle in a four-wheel-drive state.

At this time, an excitation current of the electromagnet 115 may be controlled to change a slip ratio of the pilot clutch 109. This changes the cam thrust force of the ball cam 103 to control torque transmitted to the rear wheels 11 and 13. This torque transmission control may be carried out, for example, during a turn operation, to greatly improve the turning ability and stability of the vehicle.

When the electromagnet 115 is inactivated, the pilot clutch 109 disengages to make the cam thrust force of the ball cam 103 disappear. The pushing force of the return spring 111 returns the pressure plate 105 to release the main clutch 101 and disengage the clutch 33. As a result, the vehicle is put in a two-wheel-drive state with the front wheels 7 and 9 being driven.

The releasing operation of the clutch 33 is carried out together with the stopping operation of the electric motor 5 as mentioned above. In the two-wheel-drive state, the outer differential case 95, reduction mechanism 29, and electric motor 5 are separated from the revolving rear wheels 11 and 13 and are prevented from mechanically turning.

As a result, the reduction mechanism 29, the electric motor 5, the bearings thereof, the battery 37, and circuit elements of integrated circuits such as regulators are protected from bad influences due to rotation caused by the rear wheels 11 and 13 and thereby improve the durability thereof.

Embodiment 2

Figure 3:
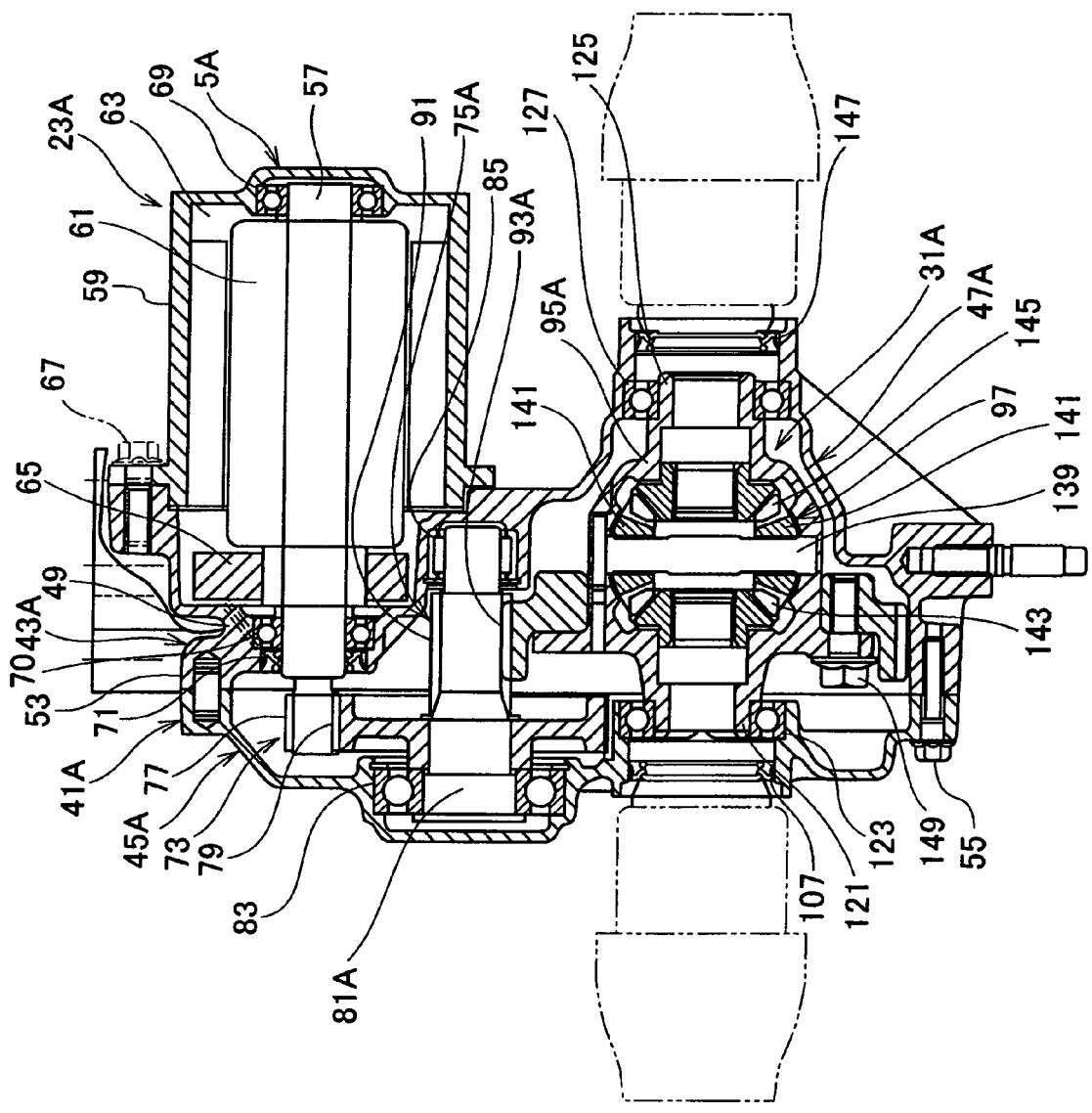
FIG. 3 is a sectional view showing a reduction drive device (Embodiment 2)

FIG. 3 is a sectional view showing a reduction drive device according to an embodiment 2 of the present invention. This embodiment is basically configured like the embodiment 1 of FIG. 2 and components corresponding to those of the embodiment 1 are explained with the use of the same reference marks or the same reference marks plus "A."

According to the embodiment shown in FIG. 3, a rear differential 31A serving as a distribution mechanism is not provided with the clutch 33 of the embodiment 1 and a large gear 93A of a second reduction mechanism 75A is fixed to a differential case 95A with bolts 149.

Accordingly, this embodiment employs a slightly different torque transmission configuration. Through the large gear 93A of the second reduction mechanism 75A, torque is directly transmitted to the differential case 95A and the torque is distributed from the differential case 95A to left and right axle shafts 25 and 27 through a differential mechanism 97.

In addition, this embodiment employs a casing 41A having a slightly different structure. Namely, a second shaft 81A has no rotation detecting gear, and at an end of the second shaft 81A, a cover 45A has a closed structure. Since the rear differential 31A has no clutch, a rear differential container 47A of a casing body 43A is smaller than that of the embodiment 1 and there is a sufficient space with respect to an electric motor 5A.

A distribution mechanism is formed with the differential case 95A and differential mechanism 97. With respect to the distribution mechanism, part of a rotor 61, part of stator 63 and a brush 65 that are internal functional parts of the electric motor 5A overlap in a rotation radius direction (vertical direction in FIG. 2). This is a characteristic structure like that of the embodiment 1.

Accordingly, this embodiment provides operation and effect that are similar to those provided by the embodiment 1.

This embodiment omits the clutch, and therefore, the structure thereof is simpler. There is a sufficient space between the rear differential container 47A and the electric motor 5A, to expedite the cooling of the electric motor 5A.

Embodiment 3

Figure 4:
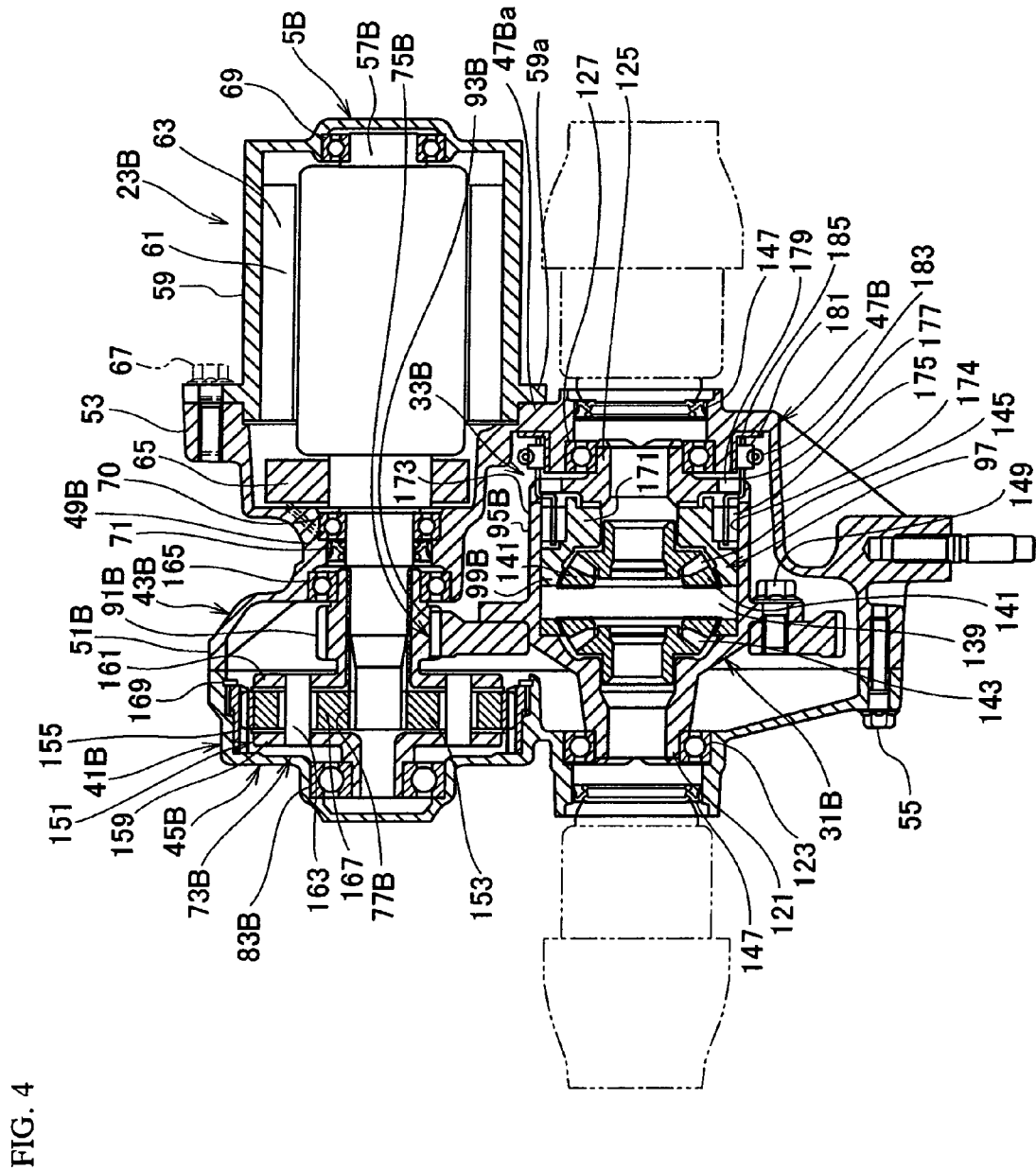
FIG. 4 is a sectional view showing a reduction drive device (Embodiment 3)

FIG. 4 is a sectional view showing a reduction drive device according to an embodiment 3 of the present invention. This embodiment is basically configured like the embodiment 1 of FIG. 2 and components corresponding to those of the embodiment 1 are explained with the use of the same reference marks or the same reference marks plus "B."

As shown in FIG. 4, the reduction drive device 23B has a first reduction mechanism 73B of modified structure, a second reduction mechanism 75B of modified arrangement, and a clutch 33B of modified structure, to uniquely arrange an electric motor 5B and a distribution mechanism.

The first reduction mechanism 73B of this embodiment consists of a planetary gear mechanism having a planetary carrier 151, planetary gears 153, an internal gear 155, and a sun gear 77B.

Left and right carrier plates 159 and 161 of the planetary carrier 151 support carrier pins 163. The carrier pins 163 are arranged in a circumferential direction of the planetary carrier 151. The carrier plate 159 is rotatably supported by a ball bearing 83B with respect to a cover 45B. The other carrier plate 161 is integrally provided with a small gear 91B of the second reduction mechanism 75B. The carrier plate 161 and small gear 91B are rotatably supported by a ball bearing 165 with respect to a motor shaft support 49B. A cover joint 51B is axially wider than that of the embodiment 1, to receive the small gear 91B. The cover joint 51B accommodates the small gear 91B. To support the ball bearings 70 and 165 and an oil seal 71, the motor shaft support 49B is slightly longer in a rotary axis direction than that of the embodiment 1.

The planetary gears 153 are arranged in a rotational circumferential direction of the planetary carrier 151. Each planetary gear 153 is rotatably supported by a needle bearing 167 with respect to the carrier pin 163.

The internal gear 155 is axially inserted into an inner circumferential face of the cover 45B and is stopped from rotation by engagement. The internal gear 155 is prevented from dropping off the cover 45B with the use of a snap ring 169.

The sun gear 77B is a reduction gear of the first reduction mechanism 73B and is integral with an output shaft 57B of the electric motor 5B. The planetary gears 153 mesh with the sun gear 77B and internal gear 155.

A motor joint 53 of a casing body 43B is slightly away from the cover joint 51B in a rotary axis direction compared with the embodiment 1. However, it is substantially at the same position as an end of a rear differential container 47B. Due to this arrangement, a fitting flange 59a of a motor cover 59 abuts against a fastening part 47Ba at the end of the rear differential container 47B and is fixed thereto.

A large gear 93B of the second reduction mechanism 75B meshes with the small gear 91B and is fixed to a differential case 95B with bolts 149.

The differential case 95B accommodates and supports an inner case 99B. The inner case 99B is rotatable relative to the differential case 95B. The inner case 99B has a rotation axis that is concentric with a rotation axis of the differential case 95B and is substantially cylindrical.

The inner case 99B supports pinion gears 141 through a pinion shaft 139 of a differential mechanism 97. The pinion gears 141 mesh with left and right side gears 143 and 145. The side gears 143 and 145 are interlinked with axle shafts 25 and 27 of rear wheels 11 and 13.

An end of the inner case 99B has a joint 171 whose diameter is smaller than the diameters of other parts. The differential case 95B has a meshing part 173 positioned on the outer circumferential side of the joint 171. An inner circumference of the meshing part 173 is polygonal in a circumferential direction and has a plurality of flat meshing faces 174. Between the joint 171 and the meshing faces 174, there are interposed rollers 175. The rollers 175 are rotatably supported by a support member 177. The support member 177 extends through a through hole 179 of the differential case 95B to the outside of the differential case 95B, to engage with a brake shoe 181.

A ring spring 183 is wound on an outer circumference of the brake shoe 181. The spring 183 presses the brake shoe 181 toward an inner circumferential side. On the inner circumferential side of the brake shoe 181, there is a steel slide plate 185. The brake shoe 181 is pressed against the slide plate 185. The slide plate 185 is supported on the rear differential container 47B side. The slide plate 185 functions as a lining for the rear differential container 47 made of light metal such as aluminum.

The joint 171, meshing part 173, rollers 175, support member 177, brake shoe 181, spring 183, and slide plate 185 form a two-way clutch 33B. The electric motor 5B and clutch 33B are arranged on parallel axes and at least partly overlap each other when seen in a radial direction.

Torque transmission of this embodiment will be explained.

When the electric motor 5B turns, the output shaft 57B and sun gear 77B turn together to rotate the planetary gears 153. The planetary gears 153 turn around the carrier pins 163 and revolve. The rotation and revolution of the planetary gears 153 make the carrier plates 159 and 161 rotate at a reduced speed. At this time, the small gear 91B of the second reduction mechanism 75B rotates together.

When the small gear 91B rotates, the large gear 93B rotates together. The meshing rotation between the small gear 91B and the large gear 93B also reduces a rotation speed, and at the reduced rotation speed, torque is transmitted to the differential case 95B.

The support member 177 frictionally engages through the brake shoe 181 with the slide plate 185. Due to the frictional engagement, the rotation of the support member 177 delays relative to the differential case 95B. Due to the delay, the rollers 175 mesh with the meshing face 174 and the differential case 95B and inner case 99B together turn to transmit torque to the rear wheels 11 and 13 as mentioned above.

When the rotational output of the electric motor 5B stops, the rotation of the differential case 95B also stops. At this time, even if the rotational input from the left and right rear wheels turns the inner case 99B through the side gears 143 and 145, pinion gears 141, and pinion shaft 139, each roller 175 enters into a valley of the meshing face 174 and turns idly and never meshes with the meshing face 174. As a result, the inner case 99B freely turns relative to the differential case 95B.

In the free relative rotation state with the electric motor 5B stopped, even if torque is transmitted from the rear wheels 11 and 13 to the axle shafts 25 and 27 and side gears 143 and 145, only the inner case 99B turns through the side gears 143 and 145, pinion gears 141, and pinion shaft 139 and no rotation is transmitted to the differential case 95B.

As a result, the second reduction mechanism 75B is kept stopped, and therefore, the rotation of the rear wheels 11 and 13 never turns the second reduction mechanism 75B, first reduction mechanism 73B, and electric motor 5B. This surely suppresses a large energy loss caused by reversely driving the reduction mechanisms 73B and 75B and an energy loss caused by driving the stopped electric motor 5B by the rear wheels 11 and 13, thereby improving a fuel consumption efficiency and the durability of the electric motor 5B.

According to this embodiment, the differential case 95B and differential mechanism 97 form a distribution mechanism. With respect to the distribution mechanism, part of a rotor 61, part of a stator 63 and a brush 65 that are internal functional parts of the electric motor 5B overlap in a rotation radius direction (vertical direction in FIG. 2). In this way, this embodiment has a characteristic structure like the embodiment 1.

Due to this, this embodiment can provide operation and effect similar to those provided by the embodiment 1.

According to this embodiment, the motor joint 53 is arranged substantially at the same position as an end of the rear differential container 47B. Due to this arrangement, a fitting flange 59a of a motor cover 59 abuts against a fastening part 47Ba formed at an end of the rear differential container 47B and is fastened thereto. This improves the strength of the periphery of the motor joint 53, to reinforce the fitting strength of the electric motor 5B and improve noise/vibration controllability.

In addition, this embodiment employs the planetary gear mechanism for the first reduction mechanism 73B to omit the second shaft. This reduces the size in a rotation radius direction as well, to reduce an overall size.

Embodiment 4

Figure 5:
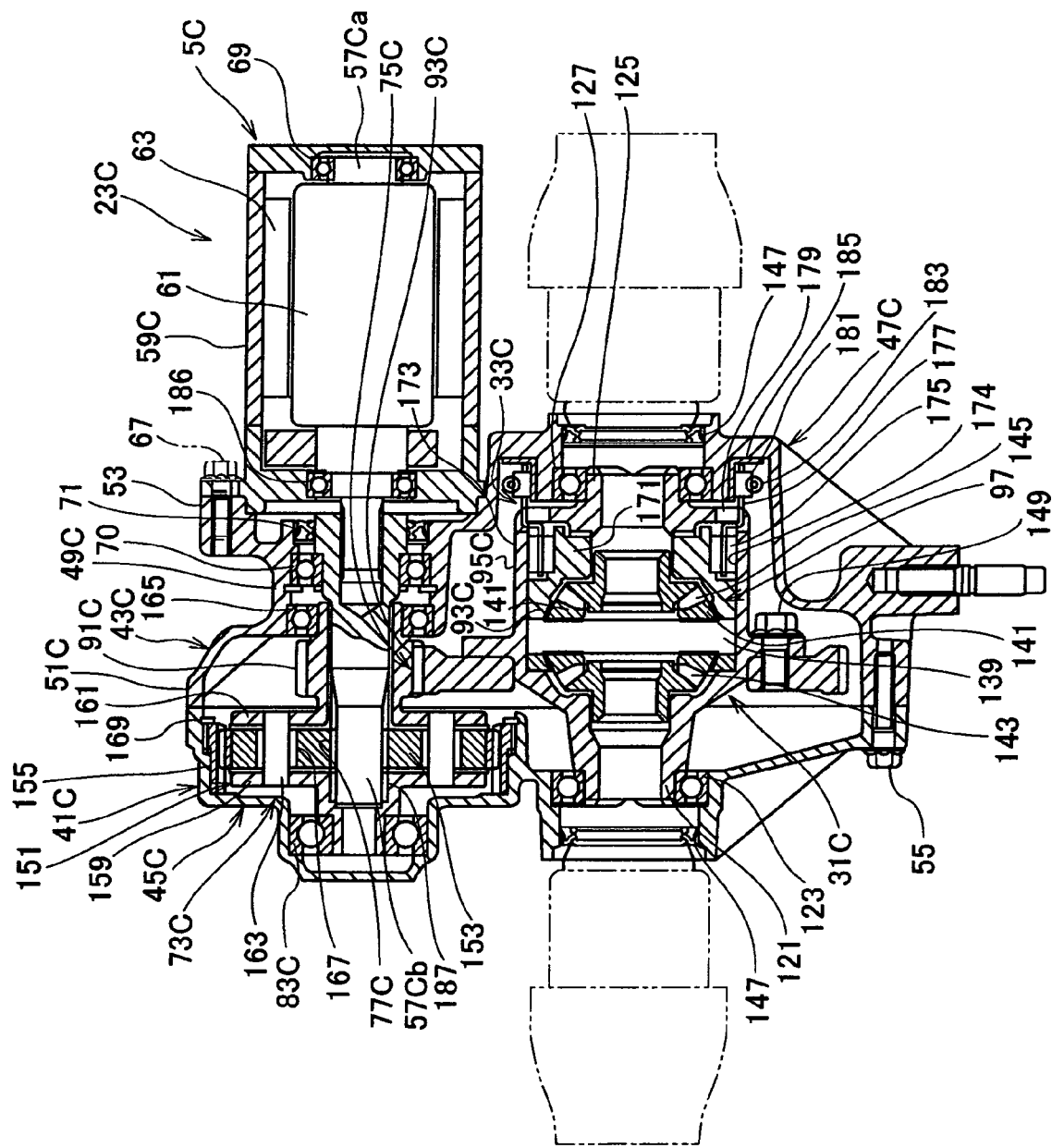
FIG. 5 is a sectional view showing a reduction drive device (Embodiment 4)
Figure 6:
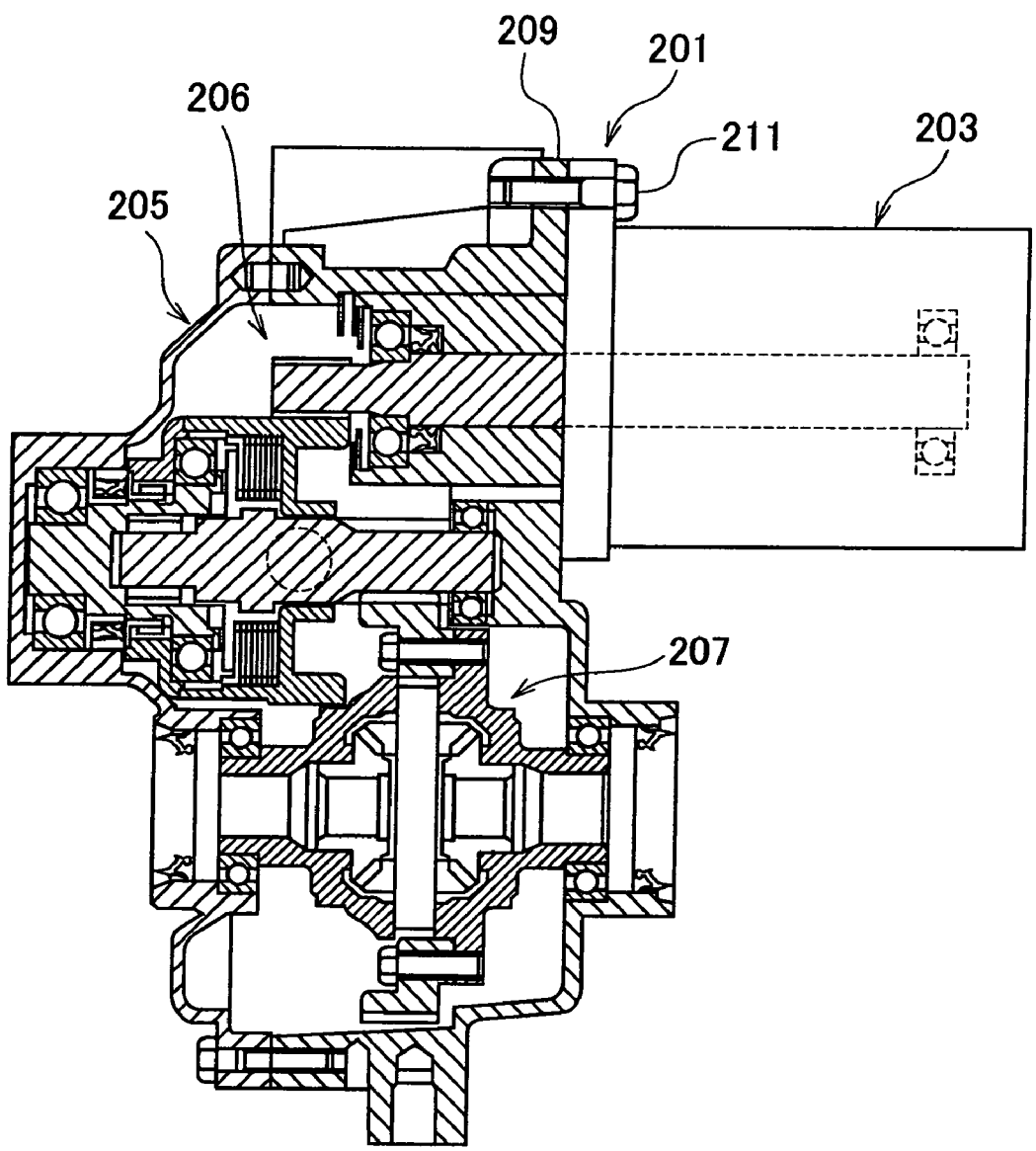
FIG. 6 is a sectional view showing a reduction drive device (Related art).

FIG. 5 is a sectional view showing a reduction drive device according to an embodiment 4 of the present invention. This embodiment is basically configured like the embodiment 3 of FIG. 4 and components corresponding to those of the embodiment 3 are explained with the use of the same reference marks or the same reference marks plus "C" instead of "B."

Compared with the embodiment 3, this embodiment arranges a motor joint 53 slightly closer to a cover joint 51C relative to a rear differential container 47C and removably engages an output shaft 57Ca integral with an electric motor 5C with a separate output shaft 57Cb through splines.

The output shaft 57Ca is supported by ball bearings 69 and 186 with respect to a motor cover 59C. An end of the output shaft 57Cb is supported by a ball bearing 70 with respect to a motor shaft support 49C and the other end thereof is supported by a needle bearing 187 so that it may freely rotate relative to a carrier plate 159.

At the motor shaft support 49C, an oil seal 71 is arranged close to the electric motor 5C.

According to this embodiment, a distribution mechanism consists of a differential case 95C and a differential mechanism 97. With respect to the distribution mechanism, part of a rotor 61, part of a stator 63 and a brush 65 that are internal functional parts of the electric motor 5C overlap in a rotation radius direction (vertical direction in FIG. 2). In this way, this embodiment has a characteristic structure like the embodiment 3.

Due to this, this embodiment can provide operation and effect similar to those provided by the embodiment 3. In addition, according to this embodiment, unfastening bolts 67 results in separating the output shafts 57Ca and 57Cb from each other, to easily remove the electric motor 5C from the casing 41C.

The invention claimed is:
1. A reduction drive device, comprising:
an electric motor attached to a casing and capable of outputting torque;
a reduction mechanism supported by the casing, to reduce the speed of and transmit the rotational output of the electric motor;
a distribution mechanism supported by the casing, to distribute the rotational output reduced by the reduction mechanism to a pair of output shafts;
internal functional parts of the electric motor partly overlapping the distribution mechanism when seen in a rotation radius direction;
the reduction mechanism having a rotary shaft disposed between the electric motor and the distribution mechanism, and first and second reduction mechanisms formed between the electric motor and the rotary shaft and between the rotary shaft and the distribution mechanism, respectively;
the internal functional parts of the electric motor including a rotor including a rotor core and a stator; and
the rotary shaft of the reduction mechanism partly overlapping at least the rotor core of the electric motor in the rotation radius direction.

2. The reduction drive device as set forth in claim 1, wherein:
the distribution mechanism comprises a differential case rotatably supported by the casing, to receive driving force reduced by the reduction mechanism and a differential mechanism supported by the differential case and coupled with the pair of output shafts.

3. The reduction drive device as set forth in claim 1, wherein:
a fitting part of the casing to which the electric motor is fitted is provided with a divided part of a motor cover that forms an outer shell of the electric motor.

4. The reduction drive device as set forth in claim 1, wherein:
an output shaft of the electric motor is provided with a reduction gear of the reduction mechanism.

5. The reduction drive device as set forth in claim 1, wherein:
the electric motor serves as a supplementary drive source for a main drive source.

6. The reduction drive device as set forth in claim 5, wherein:
the main drive source is an internal combustion engine; and
one of the internal combustion engine and electric motor drives front wheels or rear wheels and the other drives the other wheels.

7. A reduction drive device comprising:
an electric motor attached to a casing and having an output shaft capable of outputting torque and internal functional parts including a rotor core and a stator;
a reduction mechanism supported by the casing, to reduce the speed of and transmit the rotational output of the electric motor;
a distribution mechanism supported by the casing, to distribute the rotational output reduced by the reduction mechanism to a pair of output shafts;
the distribution mechanism including a differential mechanism, the differential mechanism having a pinion shaft, pinion gears, and output side gears, so that the rotational output is distributed from the pinion shaft to the side gears through the pinion gears;
the casing including a casing body and a cover;
the casing body including a motor joint to which the electric motor is attached, a cover joint to which the cover is attached, and a motor shaft support disposed axially between the motor joint and the cover joint and supporting the output shaft of the electric motor, the motor joint and cover joint being axially opposite each other to interpose the motor shaft support between them; and the motor shaft support axially shifted toward the cover with respect to the pinion shaft of the differential mechanism such that the rotor core of the electric motor partly overlaps the distribution mechanism when seen in a rotation radius direction.

8. A reduction drive device comprising:

an electric motor attached to a casing and having an output shaft capable of outputting torque and internal functional parts;

a reduction mechanism supported by the casing, to reduce the speed of and transmit the rotational output of the electric motor;

a distribution mechanism supported by the casing, to distribute the rotational output reduced by the reduction mechanism to a pair of output shafts that are not within the distribution mechanism;

the internal functional parts of the electric motor partly overlapping the distribution mechanism when seen in a rotation radius direction;

the casing including a casing body and a cover;

the casing body including a motor joint to which the electric motor is attached, a cover joint to which the cover is attached, and a motor shaft support disposed axially between the motor joint and the cover joint, said motor shaft support radially supporting a bearing which directly supports the output shaft of the electric motor, the motor joint and cover joint being axially opposite each other to interpose the motor shaft support and said bearing associated therewith between them; and at least a portion of the internal functional parts disposed axially between the motor joint and the motor shaft support and overlapping the distribution mechanism in the rotation radius direction.

9. A reduction drive device comprising:

an electric motor attached to a casing and having a motor cover separated from the casing, an output shaft capable of outputting torque and internal functional parts;

a reduction mechanism supported by the casing, to reduce the speed of and transmit the rotational output of the electric motor;

a distribution mechanism supported by the casing, to distribute the rotational output reduced by the reduction mechanism to a pair of output shafts;

the internal functional parts of the electric motor partly overlapping the distribution mechanism when seen in a rotation radius direction;

the casing including a casing body and a cover;

the casing body including a motor joint to which the motor cover of the electric motor is attached, a motor shaft support, and a container adjoining to the motor joint in the rotation radius direction and containing the distribution mechanism therein; and a common wall portion constituting a part of the motor joint and a part of the container and sectioning the motor joint and the container, the motor shaft support axially protruding from the motor joint so as to overlap the distribution mechanism in a rotation radius direction.

10. The reduction drive device as set forth in claim 9 wherein the common wall portion has an axial end that is set as an axial end of the container and a fastening part of the motor joint, and the electric motor has a flange to be brought into contact with the fastening part of the motor joint.

11. The reduction drive device as set forth in claim 9 wherein the common wall portion has an axial end that is set as an axial end of the container and an axial middle portion that is set as a fastening part of the motor joint, and the electric motor has a flange to be brought into contact with the fastening part of the motor joint.

12. The reduction drive device as set forth in claim 9 wherein the reduction mechanism has first and second reduction mechanisms, the first reduction mechanism has a planetary carrier rotatably supported around the output shaft of the electric motor, planetary gears rotatably supported by the planetary carrier, and a sun gear formed on the output shaft of the electric motor and meshing with the planetary gears, and the second reduction mechanism has a pair of gears provided on the planetary carrier and the distribution mechanism, respectively.

13. A reduction drive device comprising:

an electric motor attached to a casing, the electric motor having an output shaft capable of outputting torque and a motor cover receiving internal functional parts therein;

a reduction mechanism supported by the casing, to reduce the speed of and transmit the rotational output of the electric motor;

a distribution mechanism supported by the casing, to distribute the rotational output reduced by the reduction mechanism to a pair of output shafts;

the internal functional parts of the electric motor partly overlapping the distribution mechanism when seen in a rotation radius direction; and a pair of bearings directly supporting the output shaft of the electric motor, one of the bearings being received on the motor cover so as to overlap an end wall of the motor cover in the rotation radius direction, an other of the bearings being received on the casing so as to overlap the distribution mechanism in the rotation radius direction.

14. A reduction drive device comprising:

an electric motor attached to a casing and capable of outputting torque;

a reduction mechanism supported by the casing, to reduce the speed of and transmit the rotational output of the electric motor;

a distribution mechanism supported by the casing, to distribute the rotational output reduced by the reduction mechanism to a pair of output shafts;

internal functional parts of the electric motor partly overlapping the distribution mechanism when seen in a rotation radius direction;

the reduction mechanism having a rotary shaft disposed between the electric motor and the distribution mechanism, and first and second reduction mechanisms formed between the electric motor and the rotary shaft and between the rotary shaft and the distribution mechanism, respectively; and the internal functional parts of the electric motor including a rotor, a stator, and a brush; and the rotary shaft of the reduction mechanism partly overlapping at least the brush of the electric motor in the rotation radius direction.

* * * * *

UNITED STATES PATENT AND TRADEMARK OFFICE
CERTIFICATE OF CORRECTION

PATENT NO. : 7,990,004 B2
APPLICATION NO. : 11/992256
DATED : August 2, 2011
INVENTOR(S) : Masashi Aikawa, Masayuki Sayama and Yoshiyuki Nakabayashi It is certified that error appears in the above-identified patent and that said Letters Patent is hereby corrected as shown below:

Title Page, Item (22)

Please correct the International PCT application filing date from:

(22)    PCT Filed:    "Sep. 16, 2006"

to

(22)    PCT Filed:    --Sep. 19, 2006--

Signed and Sealed this
Twenty-second Day of November, 2011

David J. Kappos
*Director of the United States Patent and Trademark Office*